(12) United States Patent
Chen et al.

(10) Patent No.: US 12,225,059 B2
(45) Date of Patent: Feb. 11, 2025

(54) PROVIDING CYBERSECURITY SERVICES BY A NETWORK AND AUTOMATED PROVISIONING THEREOF

(71) Applicant: Orange, Issy-les-Moulineaux (FR)

(72) Inventors: Xiaobao Chen, Bristol (GB); Christophe Naulleau, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 232 days.

(21) Appl. No.: 17/783,589

(22) PCT Filed: Dec. 7, 2020

(86) PCT No.: PCT/EP2020/084921
§ 371 (c)(1),
(2) Date: Jun. 8, 2022

(87) PCT Pub. No.: WO2021/116033
PCT Pub. Date: Jun. 17, 2021

(65) Prior Publication Data
US 2023/0021843 A1    Jan. 26, 2023

(30) Foreign Application Priority Data
Dec. 9, 2019   (EP) ..................................... 19306601

(51) Int. Cl.
*H04L 9/40* (2022.01)
(52) U.S. Cl.
CPC .................................. *H04L 63/205* (2013.01)
(58) Field of Classification Search
CPC ........ H04L 63/205; H04L 63/20; H04W 12/60
See application file for complete search history.

(56) References Cited

U.S. PATENT DOCUMENTS

| | | |
|---|---|---|
| 2019/0124502 A1 | 4/2019 | Zhang et al. |
| 2019/0141081 A1 | 5/2019 | Kunz et al. |

(Continued)

FOREIGN PATENT DOCUMENTS

| | | |
|---|---|---|
| WO | WO 2017/200978 A1 | 11/2017 |

OTHER PUBLICATIONS

International Search Report and Written Opinion dated Dec. 22, 2020 for Application No. PCT/EP2020/084921.

(Continued)

*Primary Examiner* — Sm A Rahman
(74) *Attorney, Agent, or Firm* — Knobbe, Martens, Olson & Bear, LLP

(57) ABSTRACT

Systems and methods for providing cybersecurity services by a network and for automating the provisioning of the cybersecurity services are disclosed. The system comprises a connection control function configured to receive a message in response to a request to establish a data connection from a user equipment (UE), the message including a requested CyberSecurity Control service identifier (CSC-ID) corresponding to a first security service of a plurality of security services. The CCF can interact with a cybersecurity control (CSC) function to determine, based on the requested CSC-ID, an allowed CSC-ID for the data connection, the allowed CSC-ID corresponding to a second security service of the plurality of security services; retrieve, based on the allowed CSC-ID, an operator security policy associated with the second security service. The CCF can then select and configure a network function in accordance with the retrieved operator security policy associated with the second security service.

20 Claims, 4 Drawing Sheets

(56) References Cited

U.S. PATENT DOCUMENTS

2019/0349275 A1* 11/2019 Chen ..................... H04L 12/42
2020/0281031 A1* 9/2020 Wang ................. H04W 12/041
2021/0105862 A1* 4/2021 He ..................... H04W 12/033

OTHER PUBLICATIONS

Huawei Hisilicon: "Definition and Clarification for Security Policy Control Function", 3GPP Draft; S3-161987 Definition and Clarification for SPCF, 3rd Generation Partnership Project (3GPP), Mobile Competence Centre; 650, Route Des Lucioles ; F-06921 Sophia-Antipolis Cedex; France, vol. SA WG3, Nov. 14, 2016 (Nov. 14, 2016), XP051200231, Retrieved from the Internet: URL: http://www.3gpp.org/ftp/tsg sa/WG3_Security/TSGS3 85 Santa Cruz/Docs/ [retrieved on Nov. 14, 2016].

* cited by examiner

PROVIDING CYBERSECURITY SERVICES BY A NETWORK AND AUTOMATED PROVISIONING THEREOF

RELATED APPLICATIONS

This application is the U.S. National Phase of Application No. PCT/EP2020/084921 entitled "PROVIDING CYBERSECURITY SERVICES BY A NETWORK AND AUTOMATED PROVISIONING THEREOF" and filed Dec. 7, 2020, which claims the benefit of French Patent Application No. EP 19 306 601.6, filed Dec. 9, 2019, each of which is incorporated by reference in its entirety.

FIELD OF THE INVENTION

The present invention relates to the field of communications and more particularly to providing cybersecurity services by a network.

TECHNICAL BACKGROUND

Existing mobile networks (e.g., 3GPP 4G/5GS) implement a variety of security-related functions. These functions include for example network access control functions (e.g., user authentication/authorization), connectivity data protection functions (e.g., user data privacy protection, encryption, etc.), and network integrity functions (e.g., network attack protection).

Typically, these functions are pre-selected and pre-configured at design time. For example, certain functions are required to comply with existing 3GPP standard protocols. Other functions may be designed and optionally provided by the network operator.

Generally, all of these functions relate, directly or indirectly, to the network's main service which is to provide network connectivity to users (e.g., to send and/or receive multimedia data).

However, there is a desire that functions (security-related or otherwise) be provided as a service by networks. This desire is driven by the fact that functions provided by a network can be provided on-demand based on user request and/or operator's (security) policies. This renders the service more flexible and suited to the user's needs than solutions provided by third party vendors or service integrators. This is especially the case when the functions provided are intended to be provisioned in conjunction with the network's data/multimedia connectivity services. Additionally, there is a desire to be able to configure the provisioning of network services on a per user and/or data connection basis.

SUMMARY OF THE INVENTION

The present invention provides a system for providing cybersecurity services by a network and for automating the provisioning of these cybersecurity services.

In an embodiment, the system includes a database of operator security policies corresponding to a plurality of security services provided by the system and a Cybersecurity Control (CSC) function for managing the selection and configuration of one or more of the plurality of security services to be provided to a User Equipment (UE) in conjunction with network connectivity services. The network connectivity services may be provided by the network itself or by another network.

In one aspect, the system provides a procedure for a UE to establish a data connection with an associated security service provisioned as a service by the network. Specifically, the system introduces a mechanism for a UE to request a security service and for the system to determine an allowed security service for the UE. Based on the allowed security service, the system appropriately configures one or more network functions to provide the allowed security service.

Accordingly, agile, on-demand provisioning of security services to UEs can be achieved. Furthermore, the provisioning of security services by the network increases their robustness to outside breach. For example, network provisioning allows for dynamic configuration and placement of security functions which enhances protection against attacks where they may happen.

In an embodiment, the system comprises:
 a database storing respective operator security policies corresponding to a plurality of security services provided by the network; and
 a connection control function (CCF) configured to:
 receive a message in response to a request to establish a data connection from a UE, the message including a requested CyberSecurity Control service identifier (CSC-ID) corresponding to a first security service of the plurality of security services, the first security service being requested by the UE to be provisioned for the data connection;
 interact with a CSC function to determine, based on the requested CSC-ID, an allowed CSC-ID for the data connection, the allowed CSC-ID corresponding to a second security service of the plurality of security services;
 retrieve from the database, based on the allowed CSC-ID, an operator security policy associated with the second security service corresponding to the allowed CSC-ID; and select and configure a network function in accordance with the retrieved operator security policy associated with the second security service.

In an embodiment, the network function that is configured is a Data Forwarding Function (DFF) of the network. In another embodiment, the network function may be located in a data gateway in a core network, a base station of a radio access network, or in the UE itself.

The requested CSC-ID and the allowed CSC-ID may be the same or different.

The operator security policy associated with a security service may include a security rule to be performed in association with the security service and/or a location of a network function at which the security rule is to be enforced to achieve the associated security service(s).

In an embodiment, the system comprises an Access Control Function (ACF) configured to receive the request to establish the data connection from the UE and to send the message to the CCF, with the request to establish the data connection including the requested CSC-ID.

In an embodiment, the system comprises a User Subscription Storage (USS) storing subscription information of the UE, the subscription information including security service subscription information indicating status of subscription by the UE to the plurality of security services provided by the network. As such, provisioning of security services to the UE is done based on the subscription of the UE to the various provided security services. This allows the network operator to provide each of the security services on-demand, on a per-user basis.

Specifically, in an embodiment, the CSC function is configured to: interact with the USS database to retrieve the security service subscription information of the UE; determine, based on the retrieved security service subscription information and the requested CSC-ID, the allowed CSC-ID for the data so connection; and provide the allowed CSC-ID to the CCF.

In an embodiment, the request to establish the data connection includes a network slice identifier (S-NSSAI) identifying the type of a network slice requested by the UE for the data connection. The S-NSSAI identifies the network slice requested by the UE for the data connection as a network slice with an associated security service. In an embodiment, the requested network slice is of the Cyber-Security Control type.

In another embodiment, the system comprises a Security Policy Function (SPF) comprising the database storing the respective operator security policies, and the CCF is configured to retrieve the operator security policy associated with the second security service from the database after establishing a policy association with the SPF.

In a further embodiment, the CCF is further configured to interact with the CSC function to obtain, based on the allowed CSC-ID, security configuration parameters associated with the second security service and to configure the network function according to the security configuration parameters in order to comply with the operator security policy associated with the second security service.

In another aspect, the system provides a procedure for a UE to register with the network, including registering for a security service to be provisioned along with subsequent data session.

In an embodiment, the ACF is configured to:
receive a registration request in response to registration from the UE, the registration request including a network slice identifier identifying the type of a network slice requested by the UE and a requested CSC-ID corresponding to a requested security service to be provisioned along with subsequent data connectivity with the network slice;
interact with the CSC function to determine, based on the requested CSC-ID, an allowed CSC-ID corresponding to an allowed security service for the UE; and
send a registration accept message to the UE including the allowed CSC-ID.

In a further aspect, the present invention proposes automating the provisioning of the cybersecurity services.

In an embodiment, the network providing a plurality of security services may be implemented by instantiating one or more pre-configured software packages designed to provide the plurality of security services. The software packages may be executed on one or more server platforms that provide network connectivity and processing functions. The software packages are pre-configured with the designated functions to achieve the security services. The software packages may be instantiated via the Linux Foundation Open Network Automation Platform (ONAP) and hosted on a hardware platform such as a server.

In an embodiment, any of the above-described acts may be implemented as instructions of a computer program. As such, the present disclosure provides a computer program including instructions that when executed by a processor or a range of processors cause the processor(s) to execute a method according to any of the above-described embodiments.

The computer program can use any programming language and may take the form of a source code, an object code, or a code intermediate between a source code and an object code, such as a partially compiled code, or any other desirable form.

The computer program may be recorded on a computer-readable medium. As such, the present disclosure is also directed to a computer-readable medium having recorded thereon a computer program as described above. The computer-readable medium can be any entity or device capable of storing the computer program.

BRIEF DESCRIPTION OF THE DRAWINGS

Further features and advantages of the present invention will become apparent from the following description of certain embodiments thereof, given by way of illustration only, not limitation, with reference to the accompanying drawings in which.

DETAILED DESCRIPTION OF EXAMPLE EMBODIMENTS

Systems and methods for providing cybersecurity services by a network and for automating the provisioning of these cybersecurity services are disclosed.

Figure 1:
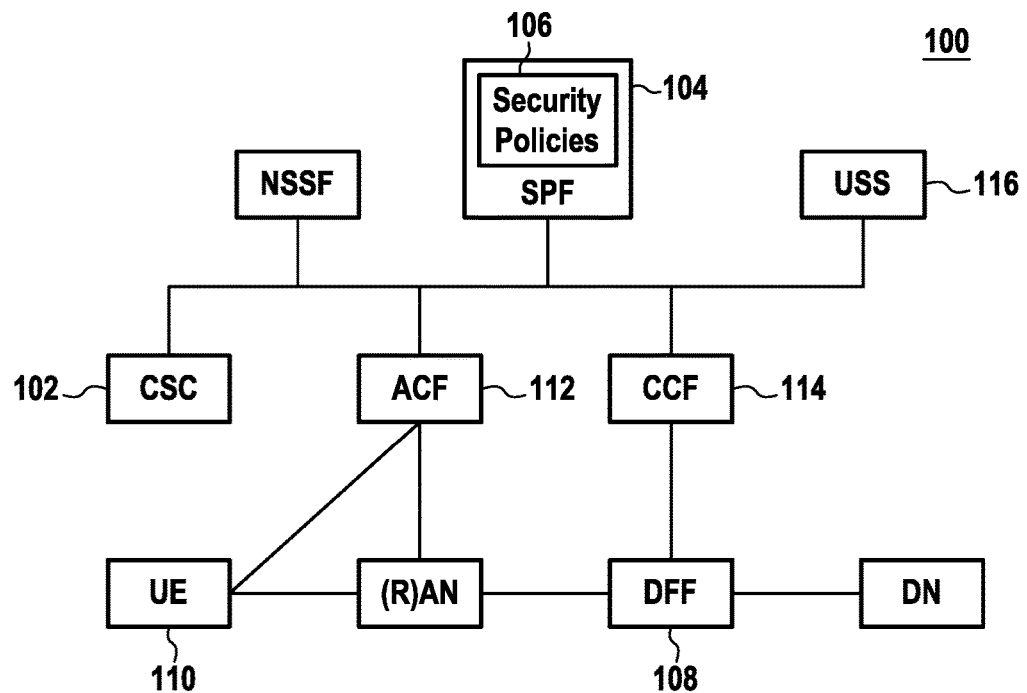
FIG. 1 illustrates an example system for providing security services according to an embodiment.

In one aspect, as shown in FIG. 1, the present disclosure proposes a system 100 for providing security services. The system 100 may be integrated into existing or future mobile telecommunications networks (e.g., 3GPP network) or may form part of an independent network.

In an embodiment, as shown in FIG. 1, the system 100 includes a Cybersecurity Control (CSC) function 102, a Security Policy Function (SPF) 104, a Data Forwarding Function (DFF) 108, an Access Control Function (ACF) 112, a Connection Control Function (CCF) 114, and a User Subscription Storage (USS) 116. In an embodiment, the system 100 may further include a network slice selection function (NSSF).

In another embodiment, the system may be connected to a (R)adio Access Network ((R)AN) and/or to a data network (DN).

The system 100 may serve one or more User Equipments (UEs) such as UE 110.

As described in further detail below, the CSC function 102 interacts with ACF 112 to enable a User Equipment UE110 to register with the network, including requesting a network slice and an associated security service that is to be provided by the network.

Additionally, the CSC function 102 interacts with CCF 114 and USS 116 to enable the establishment of a data connection with an associated security service, including the configuration of DFF 108 to provide the associated security service.

In an embodiment, the SPF 104 includes a database 106 for storing operator security policies corresponding to security services provided by the network. An operator security policy associated with a security service provided by the network includes one or more security rules to be enforced in association with the security service. In addition, the operator security policy may include location information of one or more network functions at which the one or more security rules are to be enforced.

Various security services can be provided according to embodiments of the present invention. For example, without limitation, the following security services may be provided: firewall protection, data integrity protection, parental control, intrusion detection, anti-virus protection, lawful interception, end-to-end (E2E) encryption.

However, as would be understood by a person of skill in the art based on the teachings herein, while embodiments are described herein as intended for providing security services, embodiments are not limited as such. In fact, any functionality suitable for provisioning as a service by a network operator may be provided by extending the embodiments described herein. For example, a person of skill in the art would readily appreciate that edge computing functions to provide services, such as augmented reality (AR), virtual reality (VR), etc., may be provided as a service and that embodiments described herein can be used to provide such services by a network operator.

Figure 2:
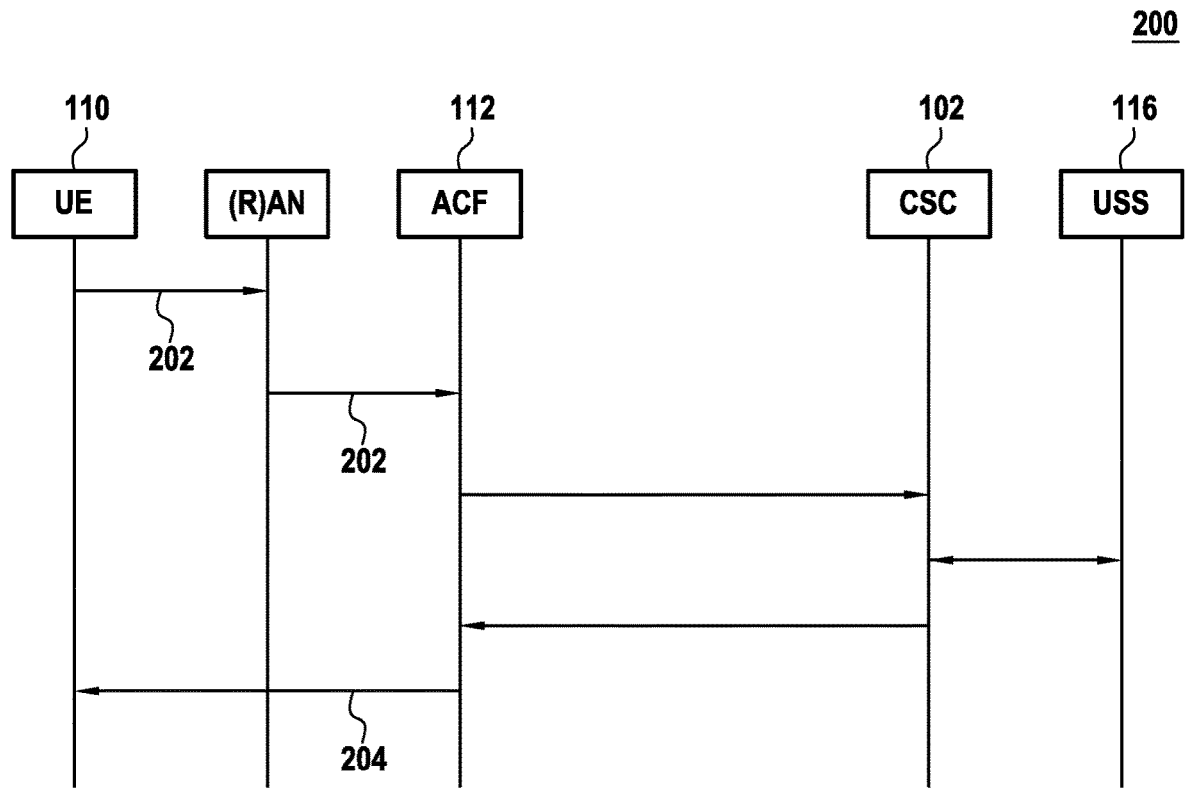
FIG. 2 illustrates a procedure for a User Equipment (UE) to register with the proposed system according to an embodiment.

FIG. 2 illustrates a procedure 200 for a UE 110 to register with a system according to an embodiment. The system may be the system 100 described above.

In accordance with the procedure 200 of the present invention, a registration request 202 from the UE 110 is received by the (R)adio Access Network (R)AN. The (R)AN forwards the registration request 202 to the ACF 112.

The registration request 202 includes at least one network slice identifier which identifies the type of a network slice requested by the UE 110. According to embodiments, the network slice requested by the 110 may be one of the following types: enhanced mobile broadband (eMBB), massive Internet of Things (mIoT), ultra-reliable low latency communication (URLLC), vehicle-to-everything (V2X), or Cybersecurity Control (CSC). In an embodiment, when a security service is also requested together with the requested network slice, the requested network slice is of the Cybersecurity Control type.

Additionally, the registration request 202 may include a requested cybersecurity control service identifier (CSC-ID) corresponding to a requested security service to be provisioned along with subsequent data connectivity with the network slice. According to embodiments, the requested CSC-ID may identify, without limitation, one of: firewall protection, data integrity protection, parental control, intrusion detection, anti-virus protection, lawful interception, end-to-end (E2E) encryption. In another embodiment, a default value in the requested CSC-ID may indicate that a security service is not being requested.

After receiving the registration request 202, the ACF 112 interacts with the CSC function 102 to determine, based on the requested CSC-ID, an allowed CSC-ID corresponding to an allowed security service for the UE. In an embodiment, the ACF 112 forwards the requested CSC-ID to the CSC function 102. The CSC function 102 interacts with the USS 116 to determine whether the UE 110 is so subscribed for the security service identified by the requested CSC-ID. If the answer is yes, the CSC function 102 returns the requested CSC-ID as an allowed CSC-ID to the ACF 112. Otherwise, the CSC function 102 returns an allowed CSC-ID which is different from the requested CSC-ID to the ACF 112. Specifically, if the UE is subscribed to another security service, the CSC-ID corresponding to the subscribed security service may be returned as the allowed CSC-ID. Otherwise, a CSC-ID with a default value indicating that the UE is not subscribed to any security service may be returned as the allowed CSC-ID.

The procedure 200 terminates with the ACF 112 sending a registration accept message 204 to the UE 110 including the allowed CSC-ID. The UE 110 may use the allowed CSC-ID as the requested CSC-ID in subsequent network requests.

Figure 3:
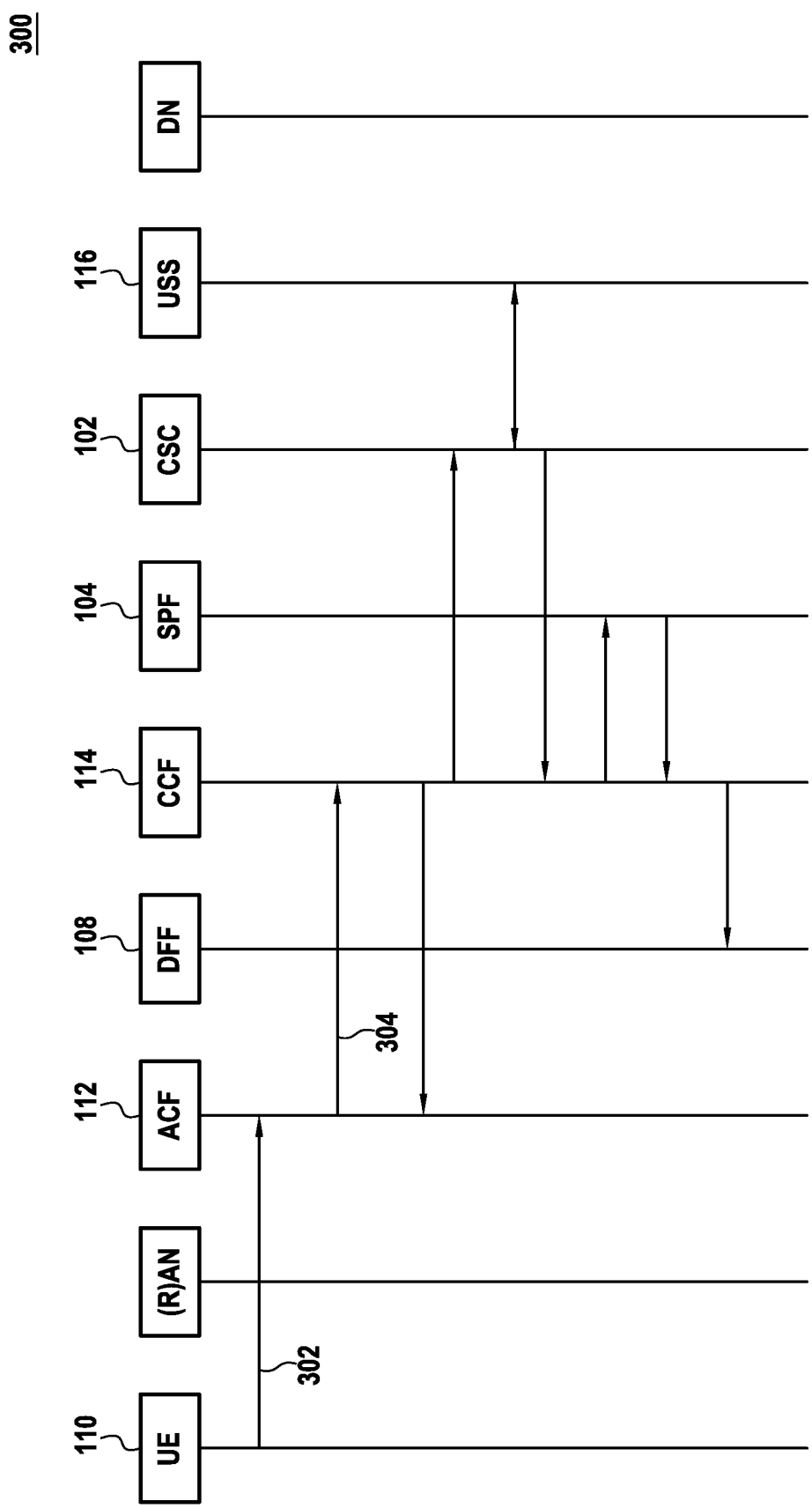
FIG. 3 illustrates a procedure for a UE to establish a data connection with the proposed system according to an embodiment.

FIG. 3 illustrates a procedure 300 for a UE 110 to establish a data connection with a system according to an embodiment. The system may be the system 100 described above.

In accordance with the procedure 300, a request 302 to establish a data connection is received by the ACF 112 from the UE 110. In an embodiment, the request 302 includes a network slice identifier identifying the type of a network slice requested by the UE 110 for the data connection. In an embodiment, the network slice identifier identifies the network slice requested by the UE 110 for the data connection as a network slice with an associated security service. In an embodiment, the requested network slice is of the Cybersecurity Control type.

In another embodiment, the request 302 may not include a requested network slice identifier. In this case, the ACF 112 determines a default network slice identifier for the requested data connection.

In an embodiment, the request 302 also includes a requested CSC-ID corresponding to a first security service being requested by the UE 110 to be provisioned for the data connection. The first security service may be one of a plurality of security services provided by the network.

After receiving the request 302, the ACF 112 performs access control checks to determine whether the UE 110 should be given access to the network, and if so sends a message 304 to the CCF 114.

In an embodiment, the message 304 includes the requested/default network slice identifier and the requested CSC-ID for the requested data session. The CCF 114 may respond to the ACF 112 by accepting to establish the data connection.

Subsequently, in accordance with the procedure 300, the CCF 114 interacts with CSC function 102 to determine, based on the requested CSC-ID, an allowed CSC-ID for the data connection. The allowed CSC-ID corresponds to a second security service of the plurality of security services provided by the network. In embodiments, the requested CSC-ID and the allowed CSC-ID may be the same or different; as such the first security service and the second security service may or may not be the same.

In an embodiment, the CSC function 102 determines and provides the allowed CSC-ID to the CCF 114. Specifically, the CSC function 102 interacts with the USS 116 to retrieve security service subscription information of the UE 110, and determines, based on the retrieved security service subscription information and the requested CSC-ID, the allowed CSC-ID for the data connection. In an embodiment, USS 116 stores subscription information of the UE 110, including the security service subscription information. The security service subscription information indicates status of subscription by the UE 110 to the plurality of security services provided by the network.

In another embodiment, the CCF 114 is further configured to interact with the CSC function 102 to obtain, based on the allowed CSC-ID, security configuration parameters associated with the second security service. For example, if the second security service is parental control, the security configuration parameters may include a list of forbidden web servers to be blocked.

Subsequently, CCF 114 establishes a policy association with the SPF 104. This allows the CCF 114 to obtain the network policies (e.g., QoS and charging policies) for the data connection from the selected SPF 104.

In an embodiment in accordance with the procedure 300, the SPF 104 also includes a database 106 storing respective operator security policies corresponding to the plurality of security services provided by the network. As such, the CCF 114 may also retrieve from the SPF 104 the operator security policy associated with the second security service corresponding to the allowed CSC-ID for the data connection. As mentioned above, the operator security associated with the second security service includes a security rule to be performed in association with the second security service, and a location of a network function at which the security rule is to be enforced.

In another embodiment, the CCF 114 may interact with the CSC function 102 as described above after performing the policy association with SPF 104. Accordingly, the retrieval of the operator security policy from SPF 104 is performed independently of the retrieval of the other network policies.

In the example of FIG. 3, the security rule associated with the second security service is to be enforced at a Data Forwarding Function (DFF). Accordingly, the CCF 114 selects and configures a DFF 108 for the data connection. In accordance with the procedure 300, the DFF 108 is selected in accordance with the retrieved operator security policy associated with the second security service. In other words, the selected DFF 108 is consistent with the security rule to be performed in association with the second security service and the location of the network function at which the security rule is to be enforced. For example, if the second security service is parental control, the selected DFF 108 may be a DFF that resides at the customer premises equipment (CPE) where packet filtering and blocking associated with parental control is to be provided.

In other embodiments, depending on the security service, the network function may be located in a data gateway in a core network, a base station of a radio access network, or in the UE itself.

In an embodiment, the CCF 114 configures the DFF 108 according to the security configuration parameters associated with the second security service, retrieved previously from the CSC function 102. This ensures that the CCF 114, and the established data connection, comply with the operator security policy associated with the second security service.

Subsequently, data between the UE 110 and the DN may flow over the established connection, subject to the configuration of the DFF 108.

In an embodiment, the system 100 may be integrated into an existing network. For example, the system 100 may be integrated into a 3GPP 5GS network. According to such an embodiment, the procedure 200 may be integrated in the UE registration procedure as described in 3GPP TS 23.502 v16.2.0, and the procedure 300 may be integrated in the PDU session establishment procedure as described in 3GPP TS 23.501 v16.2.0.

According to an aspect of the present invention, the above described provisioning of security services may be automated such that network resources for supporting the described security services can be dynamically deployed and configured on demand.

In an embodiment, this automation is accomplished by instantiating pre-configured software packages or a pre-defined template (which describes the operations of the security services and the required computing and network resources) (hereinafter collectively referred to as "software package") designed to enable the provisioning of one or more security services. In an embodiment, the instantiation of a pre-configured software package results in the setup of a network slice configured to support the one or more security services provided by a physical communication system or network.

Figure 4:
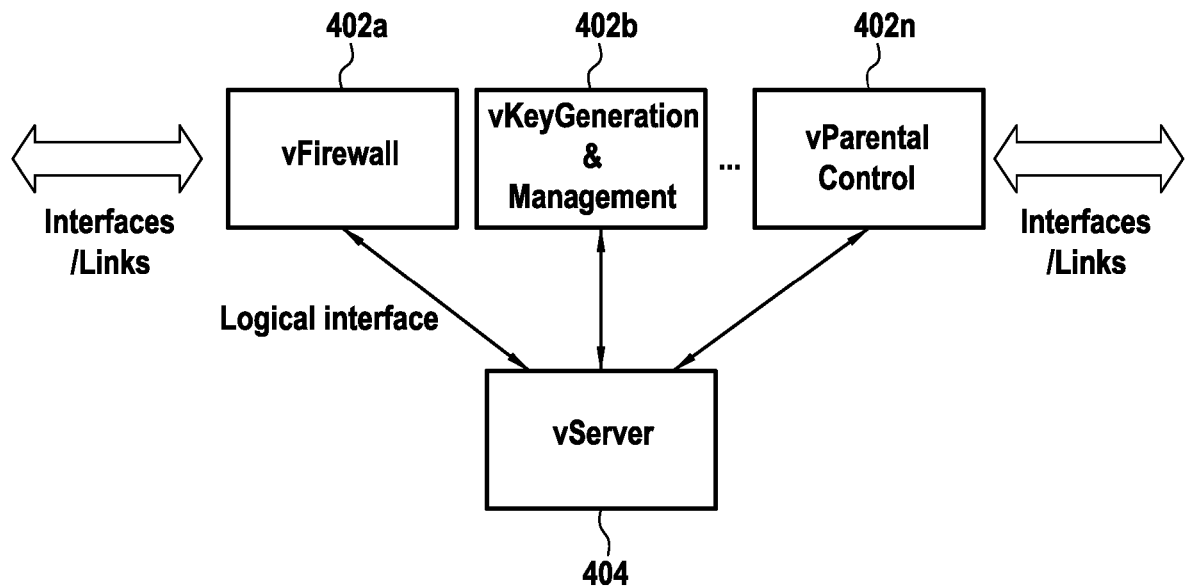
FIG. 4 is an example illustrating the instantiation of pre-configured software packages to enable the provisioning of security services according to an embodiment.

FIG. 4 illustrates this concept. As shown, a plurality of pre-configured software packages 402*a*, 402*b*, . . . , 402*n* may be designed, with each pre-configured software package for a respective service designed to be executed by a respective network function as a service. For example, software package 402*a* is designed to support firewall protection as a service; software package 402*n* is designed to support parental control as a service, etc.

In an embodiment, a software package includes a full/end-to-end description of the operations of all network functions (e.g., ACF, SPF, CCF, CSC, etc.) that form the corresponding network.

One or more of the pre-configured software packages 402*a*, 402*b*, . . . , 402*n* may be loaded onto a virtual server (vServer) 404 to instantiate them on demand.

In addition, a placement policy may be designed and associated with each of the pre-configured software packages 402*a*, 402*b*, . . . , 402*n*. The placement policy defines rules for placing the functions of a software package at instantiation. The rules may relate to location(s), hardware requirements, etc. of the various functions.

Figure 5:
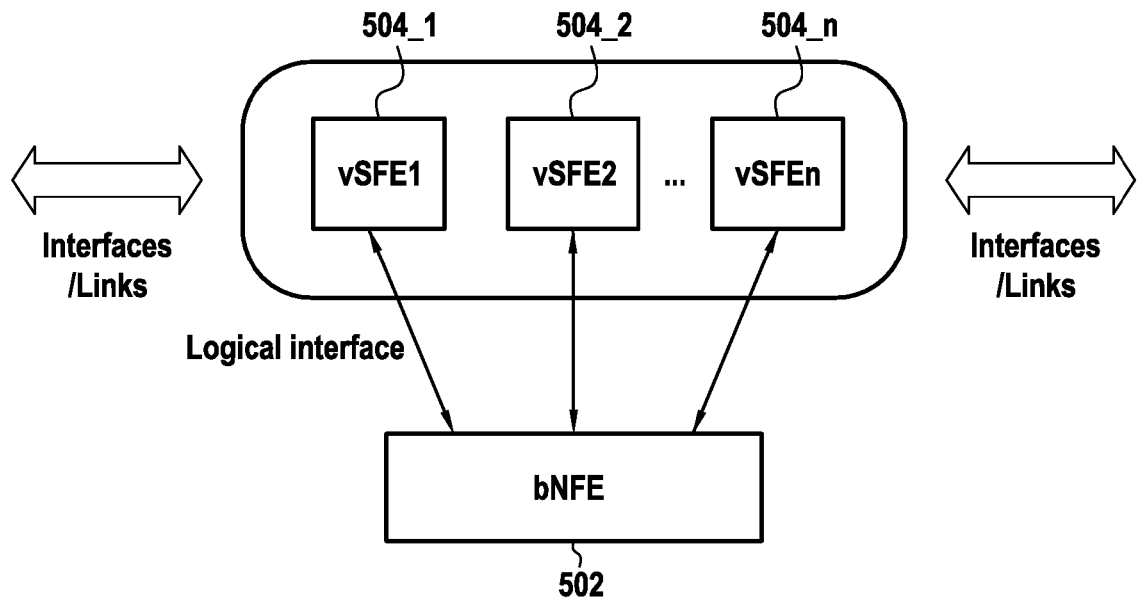
FIG. 5 illustrates an example implementation of a network function according to an embodiment.

In an embodiment, as shown in FIG. 5, a network function may be split into a basic network function element (bNFE) 502 and one or more virtualized service function elements (vSFEs) 504. The bNFE 502 provides network connectivity and processing functions. A vSFE 504 implements functions to be performed by the network function to enable the provisioning of a specific function as a service.

As shown, the bNFE 502 may be associated with one or more vSFEs 504. As such, the resulting network function may be capable of provisioning the one or more specific services as described by the by the software packages associated with the corresponding vSFEs 504.

Using this building block, a complete software package may be created to support one or more security services by performing the security control operations at the corresponding constituent network functions, one by one, to have the specific vSFEs associated with the one or more security services running at the network functions.

In an embodiment, the one or more vSFEs associated with a network service such as a security service may be virtualized to form virtualized network functions (VNFs). The VNFs can then be hosted on an industry-standard server. For example, the Linux Foundation Open Network Automation Platform (ONAP) may be used to host vSFEs associated with individual network functions with the associated services and/or complete software packages associated with each of the vSFEs. The vSFEs may be associated with respective placement policies. At instantiation, the ONAP Optimization Framework Homing Service may be used to place the vSFEs appropriately in accordance with the respective placement policies. ONAP may also be used to provide lifecycle management of the hosted vSFEs, including initial deployment, configuration changes, upgrade, scale-out, scale-in, self-healing, etc.

Figure 6:
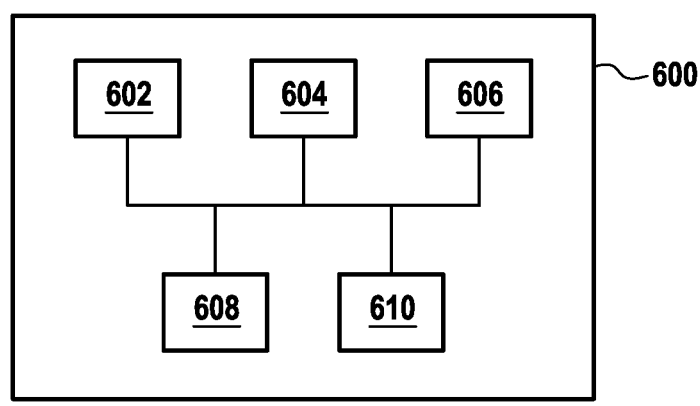
FIG. 6 illustrates a computer device which may be used to implement embodiments of the present invention.

FIG. 6 illustrates a computer device 600 which may be used to implement embodiments of the present invention. Specifically, the above-described CSC function 102, ACF 112, and CCF 114 may individually or collectively be implemented using a computer device such as computer device 600.

As shown in FIG. 6, computer device 600 includes a processor 602, a read-only memory (ROM) 604, a random access memory (RAM) 606, a non-volatile memory 608, and communication means 610 (i.e., a sender and a receiver) suitable for supporting the communication functions of the implementing module (e.g., CSC function 102, ACF 112, and/or CCF 114).

The ROM 604 of the computer device 600 may store a computer program including instructions that when executed by processor 602 cause processor 602 to perform acts of the present invention. The acts may include one or more of the acts described above in FIGS. 2, 3, 4, and 5.

Additional Variants

Although the present invention has been described above with reference to certain specific embodiments, it will be understood that the invention is not limited by the particularities of the specific embodiments. Numerous variations, modifications and developments may be made in the above-described embodiments within the scope of the appended claims.

The invention claimed is:

1. A system for providing cybersecurity services by a network, comprising:
a connection control function, CCF, configured to:
receive a message in response to a request to establish a data connection from a user equipment, UE, the message including a requested cybersecurity control service identifier, CSC-ID, corresponding to a first security service of the plurality of security services, the first security service being requested by the UE to be provisioned for the data connection;
interact with a CyberSecurity Control, CSC, function to determine, based on the requested CSC-ID, an allowed CSC-ID for the data connection, the allowed CSC-ID corresponding to a second security service of the plurality of security services;
retrieve from a database storing respective operator security policies corresponding to a plurality of security services provided by the network, based on the allowed CSC-ID, an operator security policy associated with the second security service corresponding to the allowed CSC-ID; and
select and configure a network function in accordance with the retrieved operator security policy associated with the second security service.

2. A system, comprising:
an Access Control Function, ACF, configured to:
receive a request to establish a data connection from a user equipment, UE, said request comprising a requested cybersecurity control service identifier, CSC-ID, corresponding to a first security service of a plurality of security services, and to send the message (304) to the CCF (114);
interact with a Cybersecurity control, CSC, function, to determine, based on the requested CSC-ID, an allowed CSC-ID corresponding to an allowed security service for the user equipment; and
send a registration accept message to the user equipment comprising the allowed cybersecurity control service identifier, CSC-ID.

3. The system of claim 1, comprising:
a User Subscription Storage, USS, storing subscription information of the UE, the subscription information including security service subscription information indicating status of subscription by the UE to the plurality of security services provided by the network.

4. The system of claim 3, wherein the CSC function is configured to:
interact with the USS database to retrieve the security service subscription information of the UE;
determine, based on the retrieved security service subscription information and the requested CSC-ID, the allowed CSC-ID for the data connection; and
provide the allowed CSC-ID to the CCF.

5. The system of claim 1, wherein the request to establish the data connection includes a network slice identifier identifying the type of a network slice requested by the UE for the data connection.

6. The system of claim 5, wherein the network slice identifier identifies the network slice requested by the UE for the data connection as a network slice with an associated security service.

7. The system of claim 1, wherein the operator security policy associated with the second security service includes a security rule to be performed in association with the second security service.

8. The system of claim 7, wherein the operator security policy associated with the second security service includes a network location at which the security rule is to be performed.

9. The system of claim 1, wherein the requested CSC-ID and the allowed CSC-ID are the same or different.

10. The system of claim 1, further comprising a Security Policy Function, SPF, comprising the database storing the respective operator security policies, and wherein the CCF is configured to retrieve the operator security policy associated with the second security service from the database after establishing a policy association with the SPF.

11. The system of claim 1, wherein the network function is a Data Forwarding Function (DFF) of the network, located in a data gateway of a core network, located in a base station of a radio access network, or located with the UE.

12. The system of claim 2, wherein the request to establish the data connection from the UE comprises a network slice identifier identifying the type of a network slice requested by the UE, the requested CSC-ID corresponding to a requested security service to be provisioned along with subsequent data connectivity with the network slice.

13. The system of claim 1, wherein the CCF is further configured to interact with the CSC function to obtain, based on the allowed CSC-ID, security configuration parameters associated with the second security service and to configure the network function according to the security configuration parameters in order to comply with the operator security policy associated with the second security service.

14. The system of claim 1, wherein the network is implemented by instantiating a pre-configured software package designed to provide the plurality of security services provided by the network.

15. The system of claim 14, wherein the pre-configured software package is created, hosted and instantiated via Open Network Automation Platform.

16. A method implemented on a computer device for providing cybersecurity services by a network, comprising:
receiving a message in response to a request to establish a data connection from a user equipment, UE, the message including a requested cybersecurity control service identifier, CSC-ID, corresponding to a first security service of a plurality of security services, the first security service being requested by the UE to be provisioned for the data connection;

interacting with a CyberSecurity Control, CSC, function to determine, based on the requested CSC-ID, an allowed CSC-ID for the data connection, the allowed CSC-ID corresponding to a second security service of the plurality of security services;

retrieving from a database storing respective operator security policies corresponding to a plurality of security services provided by the network, based on the allowed CSC-ID, an operator security policy associated with the second security service corresponding to the allowed CSC-ID; and selecting and configuring a network function in accordance with the retrieved operator security policy associated with the second security service.

17. A method implemented on a computer device for providing cybersecurity services by a network, comprising:

receiving a request to establish the data connection from a user equipment, UE, said request comprising a requested cybersecurity control service identifier, CSC-ID, corresponding to a first security service of a plurality of security services;

interacting with a Cybersecurity control, CSC, function, to determine, based on the requested CSC-ID, an allowed CSC-ID corresponding to an allowed security service for the user equipment; and sending a registration accept message to the user equipment comprising the allowed cybersecurity control service identifier, CSC-ID.

18. The system of claim 2, further comprising:

a User Subscription Storage, USS, storing subscription information of the UE, the subscription information including security service subscription information indicating status of subscription by the UE to the plurality of security services provided by the network.

19. The system of claim 18, wherein the CSC function is configured to:

interact with the USS database to retrieve the security service subscription information of the UE;

determine, based on the retrieved security service subscription information and the requested CSC-ID, the allowed CSC-ID for the data connection; and provide the allowed CSC-ID to the CCF.

20. The system of claim 2, wherein the request to establish the data connection includes a network slice identifier identifying the type of a network slice requested by the UE for the data connection.

* * * * *